United States Patent
Saoji et al.

(10) Patent No.: US 10,311,384 B2
(45) Date of Patent: Jun. 4, 2019

(54) AUTOMATIC CREATION AND MAINTENANCE OF A TASKLINE

(71) Applicant: Microsoft Technology Licensing, LLC, Redmond, WA (US)

(72) Inventors: Govind Saoji, Hyderabad (IN); Rohit Mani, Hyderabad (IN); Nirav Ashwin Kamdar, Hyderabad (IN); Justin Varacheril George, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 14/812,912

(22) Filed: Jul. 29, 2015

(65) Prior Publication Data
US 2017/0031576 A1   Feb. 2, 2017

(51) Int. Cl.
| | | |
|---|---|---|
| *G06Q 10/06* | (2012.01) | |
| *G06Q 10/02* | (2012.01) | |
| *G06Q 10/10* | (2012.01) | |
| *G06Q 30/02* | (2012.01) | |

(52) U.S. Cl.
CPC ........... *G06Q 10/025* (2013.01); *G06Q 10/06* (2013.01); *G06Q 10/109* (2013.01); *G06Q 30/0251* (2013.01)

(58) Field of Classification Search
CPC ................ G06F 3/0481; G06F 3/0482; G06F 17/30064; G06F 17/30528
See application file for complete search history.

(56) References Cited

U.S. PATENT DOCUMENTS

| | | | |
|---|---|---|---|
| 8,069,422 B2 | 11/2011 | Sheshagiri et al. | |
| 8,326,859 B2 | 12/2012 | Paek et al. | |
| 8,412,716 B2 | 4/2013 | Stoitsev | |
| 8,694,350 B1 | 4/2014 | Cohen et al. | |
| 8,694,355 B2 | 4/2014 | Bui et al. | |
| 8,751,472 B2 | 6/2014 | Mei et al. | |
| 9,009,592 B2* | 4/2015 | Friend | G06F 3/167 |
| | | | 715/256 |
| 2004/0019603 A1* | 1/2004 | Haigh | G06Q 10/109 |

(Continued)

OTHER PUBLICATIONS

Baltrunas, et al., "Context-Aware Places of Interest Recommendations and Explanations Document Ranking Subtasks", in Proceedings of First International Conference on Design, User Experience, and Usability, Jul. 9, 2011, 8 pages.

(Continued)

*Primary Examiner* — Omar R Abdul-Ali
(74) *Attorney, Agent, or Firm* — Shook, Hardy & Bacon, L.L.P.

(57) ABSTRACT

Methods and systems are provided for automatically generating a dynamic taskline. Initially, sources are accessed to retrieve contextual information associated with a user. From this contextual information, a user task is detected that comprises subtasks. Subtasks are identified, where the subtasks are associated with the user task. The subtasks are ranked based, in part, on the contextual information associated with the user. A taskline is automatically generated based on the ranking of the subtasks. The taskline is dynamically modified based on a particular point in time or updated contextual information associated with the user, to constantly provide the user with relevant and useful information.

20 Claims, 13 Drawing Sheets

(56) References Cited

U.S. PATENT DOCUMENTS

| | | | |
|---|---|---|---|
| 2008/0178105 A1* | 7/2008 | Loewenstein | G09B 5/00 715/764 |
| 2011/0119068 A1* | 5/2011 | Hockett | G01C 21/343 705/1.1 |
| 2011/0126123 A1* | 5/2011 | Reter | G06Q 10/109 715/751 |
| 2011/0145761 A1* | 6/2011 | Krief | G06Q 10/109 715/810 |
| 2012/0030227 A1 | 2/2012 | Mital et al. | |
| 2012/0036137 A1 | 2/2012 | Naidu et al. | |
| 2012/0036510 A1 | 2/2012 | Albers et al. | |
| 2012/0259852 A1 | 10/2012 | Aasen et al. | |
| 2012/0303792 A1 | 11/2012 | Sathish | |
| 2012/0311447 A1* | 12/2012 | Chisa | G06F 11/3082 715/719 |
| 2013/0091453 A1* | 4/2013 | Kotler | G06Q 30/0209 715/772 |
| 2013/0283211 A1* | 10/2013 | Malkin | G06Q 10/06 715/844 |
| 2014/0033071 A1* | 1/2014 | Gruber | G06Q 10/1097 715/752 |
| 2014/0046590 A1* | 2/2014 | Needham | G01C 21/343 701/522 |
| 2014/0074545 A1 | 3/2014 | Minder et al. | |
| 2014/0115464 A1* | 4/2014 | Shih | G06Q 10/109 715/716 |
| 2014/0253455 A1 | 9/2014 | Mauro et al. | |
| 2015/0005009 A1 | 1/2015 | Tomkins et al. | |
| 2015/0006564 A1 | 1/2015 | Tomkins et al. | |
| 2015/0134393 A1* | 5/2015 | De | G06Q 10/1097 705/7.21 |
| 2016/0065521 A1* | 3/2016 | Agarwal | H04L 51/18 715/752 |
| 2016/0077674 A1* | 3/2016 | Forster | G06F 3/0481 715/753 |

OTHER PUBLICATIONS

Awadallah, et al., "Supporting Complex Search Tasks", in Proceedings of the 23rd ACM International Conference on Conference on Information and Knowledge Management, Nov. 3, 2014, 10 pages.

Ullah, et al., "SEM13 at the NTCIR-11 IMINE Task: Subtopic Mining and Document Ranking Subtasks", in Proceedings of the 11th NTCIR Conference, Dec. 9, 2014, pp. 63-68.

Bedi, et al., "A Situation-Aware Proactive Recommender System", in Proceedings of 12th International Conference on Hybrid Intelligent Systems, Dec. 4, 2012, 5 pages. pp. 85-89.

* cited by examiner

AUTOMATIC CREATION AND MAINTENANCE OF A TASKLINE

BACKGROUND

Digital assistants on client devices have traditionally provided information that can be used by a user to perform a small task, such as a route to a destination location, a movie recommendation, etc. The provided information is typically generic and is not customized to a particular user. These types of systems used by digital assistants are unable to determine information that would be particularly useful to a user, and as such, the user is forced to search multiple sources, such as websites, e-mail systems, calendars, etc., to gather all information that could be used to perform a particular task. Even further, the user would need to continually search these sources to determine if anything has changed in relation to completion of a particular task. This is time consuming to the user and extremely inconvenient.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments provided herein provide relevant and useful information to a user that can be used by the user to complete a task. The information may be provided to the user by a personalized digital assistant, for example, by way of a taskline. The taskline is generated based on a user task and subtasks that are related to the user task. Both the user task and the subtasks may be determined based on contextual information associated with the user. For instance, contextual information may include e-mails, calendar entries, social media interactions, browser history, etc., all of which can be used to infer what the user is trying to accomplish and what the user is interested in. The tasklines generated using embodiments provided herein are dynamic in nature, and thus are dynamically modified based on a number of factors, including contextual information, a user's current location, which subtasks a user has accomplished, and the like.

BRIEF DESCRIPTION OF THE DRAWINGS

The embodiments described herein are described in detail below with reference to the attached drawing figures, wherein.

DETAILED DESCRIPTION

Figure 1:
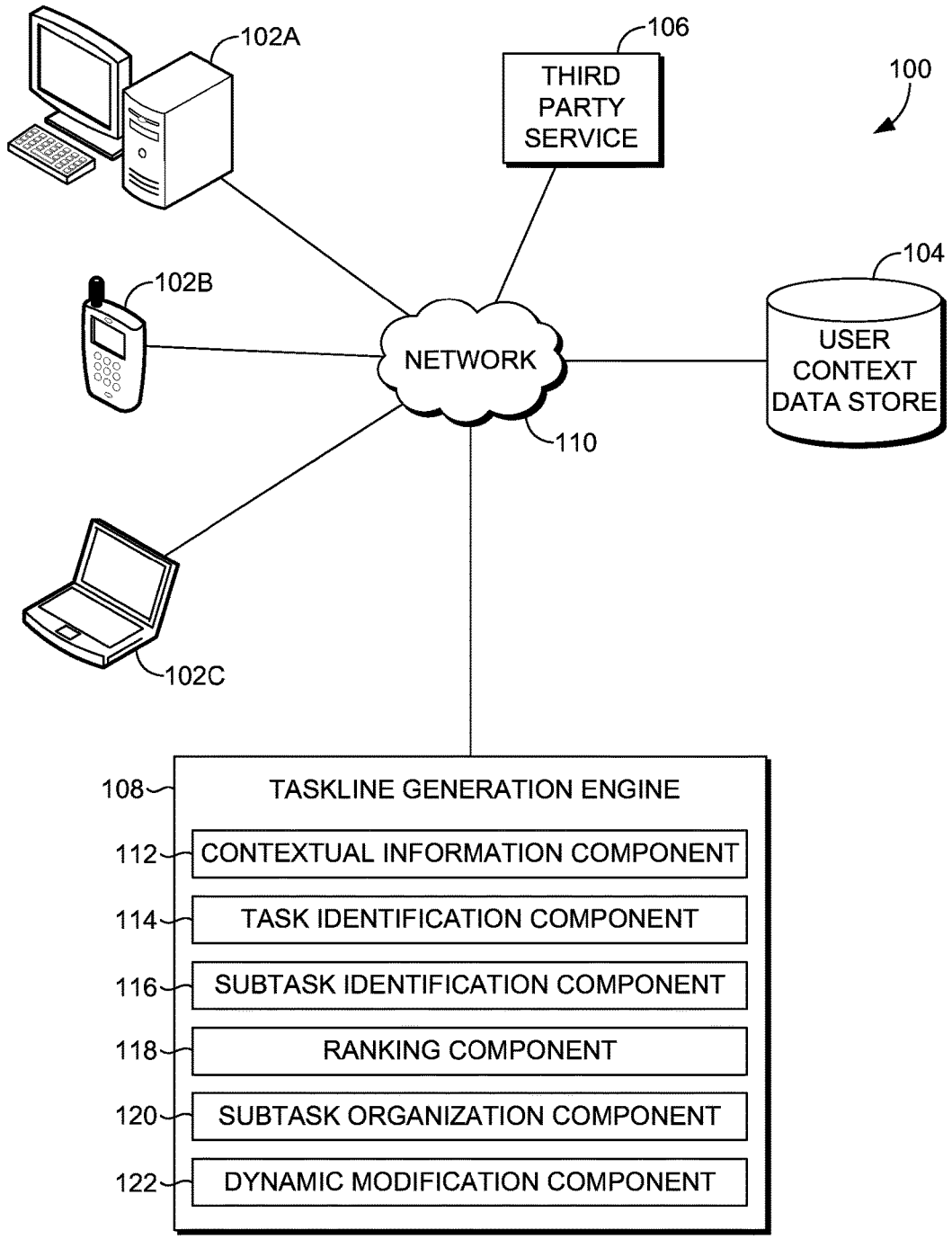
FIG. 1 is a block diagram of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among, or between, various steps herein disclosed unless, and except, when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments provided herein enable the generation of a dynamic taskline that assists the user in managing various tasks. The dynamic taskline may be presented to the user on a device by way of a personalized digital assistant, which is able to access contextual information associated with the user to infer what the user may be interested in at that time. In embodiments, contextual information associated with a user is used to infer a task that the user would like to accomplish, which could be planning an upcoming trip, managing the user's taxes, managing the user's finances, making a purchase, managing the user's health, and the like. Included in the taskline may be multiple subtasks that are provided to assist the user in accomplishing the task. Contextual information may originate from one or more sources, such as e-mail systems, browser history, selections made by a user of search results, digital calendars, social media sites, photographs taken and/or stored on the computing device, etc. While termed a subtask, not every subtask is something the user has to do in order to complete the task. For instance, for an upcoming trip, some exemplary subtasks include flight information, hotel reservations, car rental reservations, suggested restaurants in the destination city, etc. The user may not actually visit any of the restaurants that are suggested, but having the suggested restaurants that were determined based on the user's contextual information could assist the user in determining where to eat while on the trip.

In embodiments, subtasks that are identified by the system may be ranked before being presented to the user. The ranking could be accomplished based on contextual information associated with the user, including the user's current location. The contextual information may be continuously updated and stored in a data store that is accessible to the personalized digital assistant that is used to generate the dynamic taskline. The dynamic taskline is customized to a particular user, and as such, the taskline includes information that is more personalized than generic information that could be provided to any user. The user's interests, likes, dislikes, etc. can be inferred from contextual information, and may then be used to provide relevant information on the dynamic tasklines. Even further, third party data can be plugged into the system architecture to create subtasks and additional information that may be relevant to the user's task.

Advantages of embodiments presented herein include the user having all associated information for a particular task in one location on the user's device. Instead of the user having to search through e-mails, the web, calendar entries, etc., all of this information is located in one place. The user may even have the opportunity to add information in the form of a subtask to the taskline. Importantly, the taskline may be available to the user even when the user's device is offline. Another advantage of embodiments described herein is that the tasklines are dynamically modified based on current information. For instance, for a trip that the user is taking, the information provided in the taskline may be modified based on the user's current location or the subtask that the user is currently performing. As such, the user may not be interested in the layout of the destination airport or which baggage claim his/her luggage will be at one week before the user departs on the trip. However, the user could be interested in flight changes/delays, transportation to/from the airport, etc. before the user even leaves on the trip. Additionally, the dynamic tasklines may be available to the user across multiple client devices. For instance, if the user has a laptop, a mobile device, and a tablet, the tasklines generated for that user could be viewable on all devices. Additionally, if changes are made to a particular taskline on one of the user's devices, those changes would by synced across all of the user's devices. For instance, the user may make changes to a taskline, such as adding a subtask. This subtask would be synced across all devices.

According to a first embodiment, a system is provided for automatically generating a dynamic taskline. The system comprises a taskline generation engine having one or more processors and one or more computer-readable storage media. The taskline generation engine is configured to access one or more sources to retrieve contextual information associated with a user and based, at least in part, on the contextual information, detect a user task corresponding to the user. The user task is a long running task that comprises a plurality of subtasks that, when completed, contribute to a completion of the user task. The taskline generation engine is further configured to identify one or more subtasks that are associated with the user task, and to generate a taskline that is customized to the user. The taskline comprises the user task and the one or more subtasks. Additionally, the taskline generation engine is configured to, for a duration of time corresponding to the user completing the one or more subtasks, continually monitor the contextual information for updated contextual information, and to dynamically modify the taskline based on the updated contextual information.

According to a second embodiment, one or more computer storage media having computer-executable instructions embodied thereon are provided that, when executed by one or more processors, causes the one or more processors to perform a method for automatically generating a dynamic taskline. The method comprises accessing one or more sources to retrieve contextual information associated with a user, and from at least the contextual information, detecting a user task that comprises a plurality of subtasks. The method further comprises identifying one or more subtasks associated with the user task and ranking the one or more subtasks based, in part, on the contextual information, automatically generating a taskline based on the ranking of the one or more subtasks, and dynamically modifying the taskline based on a particular point in time in which the user is viewing the taskline or updated contextual information associated with the user.

According to a third embodiment, a computer-implemented method is provided for automatically generating a dynamic taskline. The method includes, based, at least in part, on contextual information associated with a user, detecting a user task corresponding to the user. The user task is a long running task that comprises a plurality of subtasks that, when completed, contribute to a completion of the user task. The method further includes identifying one or more subtasks that are associated with the user task, generating a taskline that comprises the user task and the one or more subtasks, and for a duration of time corresponding to the user completing the one or more subtasks, continually monitoring the contextual information for updated contextual information. Additionally, the method includes dynamically modifying the taskline based on the updated contextual information.

Turning now to FIG. 1, a block diagram 100 is illustrated of an exemplary operating environment in which embodiments described herein may be employed. As shown here, multiple client devices (items 102A, 102B, and 102C) may be utilized by a user to view the tasklines generated by embodiments described herein. For instance, a particular user may have a mobile device, a laptop, and a desktop computing device that the user uses in different circumstances, such as where the user is located or what the user is doing at a particular time. Each of these client devices could be any type of computing device, such as computing device 1300 described herein in relation to FIG. 13. Additional examples of computing devices include bands, glasses, watches, televisions, and any other device capable of communications with the Internet. Using client device 102A as an example, client device 102A may include code that can be used to run a personal digital assistant program. A personal digital assistant program, also termed herein a digital assistant, is a program that provides services traditionally provided by a human assistant. Exemplary services include updating a calendar, providing reminders, tracking activities, suggesting tasks and subtasks for the user based on information known about the user, etc. Digital assistants may respond to voice commands or typed commands, and may provide typed or audible responses. In embodiments herein, a digital assistant is able to generate a taskline that represents a long running task having a plurality of subtasks associated therewith. At least a portion of the long running task and the subtasks may be determined by the digital assistant program using user-specific information and contextual information associated with the user. Using this information, tasklines are generated.

Block diagram 100 further includes a user context data store 104, a third party service 106, and a taskline generation engine 108. Block diagram 100 further includes network 110, which may be wired, wireless, or both. In embodiments the client devices 102A, 102B, and 102C, the user context data store 104, the third party service 106, and the taskline generation engine 108 communicate and share data with one another by way of network 110. Network 110 may include multiple networks, or a network of networks, but is shown in simple form so as not to obscure aspects of the present disclosure. By way of example, network 110 can include one or more wide area networks (WANs), one or more local area networks (LANs), one or more public networks, such as the Internet, and/or one or more private networks. Where network 110 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 110 is not described in significant detail.

Initially, a user of one or more of client devices 102A, 102B, or 102C may provide various types of information, termed contextual information herein, which can be used by the taskline generation engine 108 to generate tasklines that are personalized for the user. The information provided by the user may include e-mails sent and received, browser history, search results selected by the user, calendar entries, social media interactions, and other information that the system is collecting, such as the user's geolocation. It is noted that while embodiments described herein use user-specific information and contextual information to generate personalized tasklines, the user may have the option to opt-in or opt-out of the use of their personal information. As such, for users who choose to opt-out, the taskline generation engine 108 may still present tasklines to the user by way of a digital assistant on the user's device, but the tasklines may be generic instead of being personalized.

The user-specific information and contextual information may be stored in the user context data store 104 for a plurality of users. As users further interact with services and websites on their devices, contextual information corresponding to that user may also change, and thus the data stored in the user context data store 104 may dynamically change, and is thus updated periodically. When it is determined that a taskline is to be generated for a particular user, the taskline generation engine 108 accesses the user content data store 104 for contextual information of the user, which is then used to generate a personalized taskline, as further described herein.

The taskline generation engine 108 comprises a contextual information component 112, a task identification component 114, a subtask identification component 116, a ranking component 118, a subtask organization component 120, and a dynamic modification component 122. Once it is determined that a taskline is to be generated for a particular user, the contextual information component 112 accesses one or more sources to retrieve contextual information corresponding to the user. In one instance, the user context data store 104 stores information from a variety of sources (e.g., e-mail system, calendar, social media sites, browser history), and thus the user context data store 104 is the only source that may be accessed. In other embodiments, without a data store such as the user context data store 104, the contextual information component 112 may actually access an e-mail system, a calendar, social media sites, browser history, etc., to retrieve the relevant contextual information. As mentioned, contextual information may continuously be updated, and thus, the sources from which contextual information can be retrieved may be periodically accessed to determine whether there is any updated contextual information.

The task identification component 114 is generally configured to infer a task that is specific to a user. For example, task identification component 114 may use the contextual information retrieved by the contextual information component 112 (e.g., received e-mails, browsing history) to determine that the user is currently planning a trip to Hawaii. The task, in this example, would be planning a trip to Hawaii. In another example, the task identification component 114 may determine from a user's search history that the user would like to purchase a new camera. The task in this case would be to purchase a new camera. Other tasks that could be inferred from contextual information corresponding to a user other than planning a trip and a shopping journey include a user's personal finances, taxes, searching for a new home, searching for a college, or really any other task that requires multiple subtasks to complete. In embodiments here, a task is referred to as a long running task. A long running task is a task that takes some time to complete. It could take a couple of hours, a few days, weeks, months, years, etc. In some embodiments, a long running task is not a short task that can be completed in a single step. For instance, a taskline comprising multiple subtasks may not be helpful to a user or may not even be possible to generate when a task comprises just a single item. The tasklines that are generated using embodiments described herein represent a task comprising multiple subtasks, and that take some time to complete.

The subtask identification component 116 is configured to identify one or more subtasks that correspond to the task identified by the task identification component 114. There are many ways that the subtask identification component 116 may identify subtasks. Many of these ways can be used in combination with one another. One exemplary way to identify subtasks is to use a rules-based system where certain subtasks are stored in association with a particular task. For example, for a task relating to travel, some exemplary subtasks that may be identified in the early stages of the trip planning may include alternative destinations, reviews from other travelers, deals and discounts, rental car options, hotel options, etc. Some exemplary subtasks that may be identified and presented to the user once the user has booked travel include flight status, visa requirements, weather, attractions, restaurant suggestions, travel time from one location to another along the user's route, currency conversion, emergency numbers, etc. As mentioned, some of these subtasks may be suggested based on a rules-based system that pre-populates subtasks as being associated with a particular task.

Alternatively, subtasks may be identified by the subtask identification component 116 based on the user's contextual information. For instance, the subtask identification component 116 may have the intelligence to determine if something found in the user's contextual information is related to the identified task. For instance, if the task is determined to be the user planning a vacation, the subtask identification component 116 may search through contextual information to determine that the user has a strong preference for a particular car rental company, and that the user strongly dislikes a certain airline. In this case, the subtask identification component 116 would have the intelligence to learn this information not only for this task but for future asks, and would provide recommendations for the car rental company preferred by the user, when possible, and would not provide airline recommendations for the airline disliked by the user, when possible.

The ranking component 118 is generally configured to rank the subtasks identified by the subtask identification component 116, discussed above. The ranking of subtasks could be based on multiple factors. For instance, the ranking system may take into consideration a current time, the current location of the user, other subtasks that have already been performed by the user or otherwise crossed off of the list of potential subtasks, other contextual information, etc. As will be described further herein, the ranking component 118 may continuously rank the subtasks that have not yet been performed so that the taskline can be dynamically updated.

The subtask organization component 120 is configured to determine an order of the subtasks after they have been ranked by the ranking component 118. For instance, as mentioned above, the ranking could be based on one or more factors. Once ranked, the subtask organization component 120 may determine which order is most appropriate for the given task, for example. If the task is a trip out of town, the order of the subtasks may different than the order of subtasks for an item purchase task. The subtask organization component 120 may recommend a particular order of subtasks to the dynamic modification component 122.

The dynamic modification component 122 is generally configured to determine when a taskline should be modified, such as when the subtasks in a taskline are to be reordered or changed (e.g., added, removed). The dynamic nature of the tasklines described herein allows the tasklines to constantly be relevant and useful to the user. As will be shown herein in various figures of exemplary screenshots, a taskline may be dynamically modified based on a user's location, such as whether a user is leaving for the airport, has arrived at the airport for a flight, or has reached the destination. As mentioned herein, not only is the system able to dynamically modify the taskline with updated information and also based on the user's whereabouts, etc., but the user may modify the taskline to add/edit/remove a subtask or to add details to a subtask (e.g., marking it as completed) or to edit properties of the task itself, such as changing the name from "Trip to Hawaii" to "Paradise in Pacific."

Figure 2:
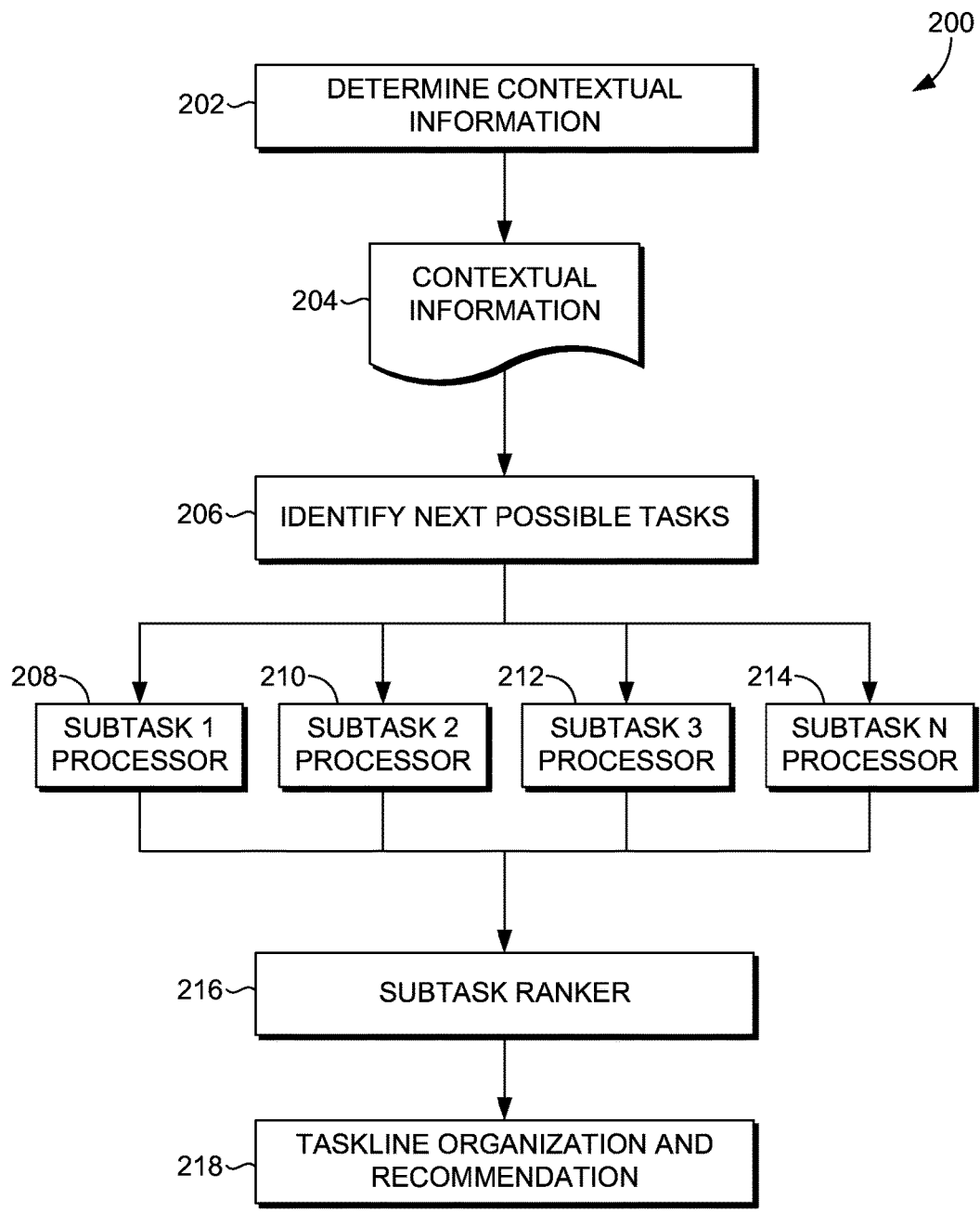
FIG. 2 is a diagram of an exemplary flowchart for generating a dynamic taskline, in accordance with embodiments described herein.

FIG. 2 is a diagram of an exemplary flowchart, generally represented as item 200, for generating a dynamic taskline, in accordance with embodiments described herein. At block 202, contextual information is determined. This could include locations, times, calendar entries, meetings, browser history, social media information, and the like. At block 204, the contextual information determined at block 202 is ordered, such as in order of time. At block 206, next possible tasks are identified from the contextual information, determined based on what may be important to the user at that time. For instance, if browser history indicates the user has been performing extensive searches for a camera, the next task could be "purchase a camera." One or more subtasks processors labeled 208, 210, 212, and 214 are then responsible for determining which subtasks are appropriate for the task. These subtask processors process the contextual information gathered at block 202 to determine routes, weather, best prices on items, transportation options, traffic conditions, restaurants to recommend based on what the user likes, etc. While four processors are illustrated in FIG. 2, it should be noted that processor 214 is termed "subtask N processor," and therefore any number of processors may be used to identify relevant subtasks to present to the user, where the subtasks correspond to the task that is the subject of the taskline.

The subtasks are then sent to the subtask ranker 216, which, as described above, is configured to rank the subtasks in one of many ways. Subtasks may be ranked by a current user location, other subtasks that have been performed or completed by the user, etc. The block 218, the taskline is organized and an order for the subtasks in the taskline is recommended. The taskline may then be presented to the user on a user device.

Figure 3:
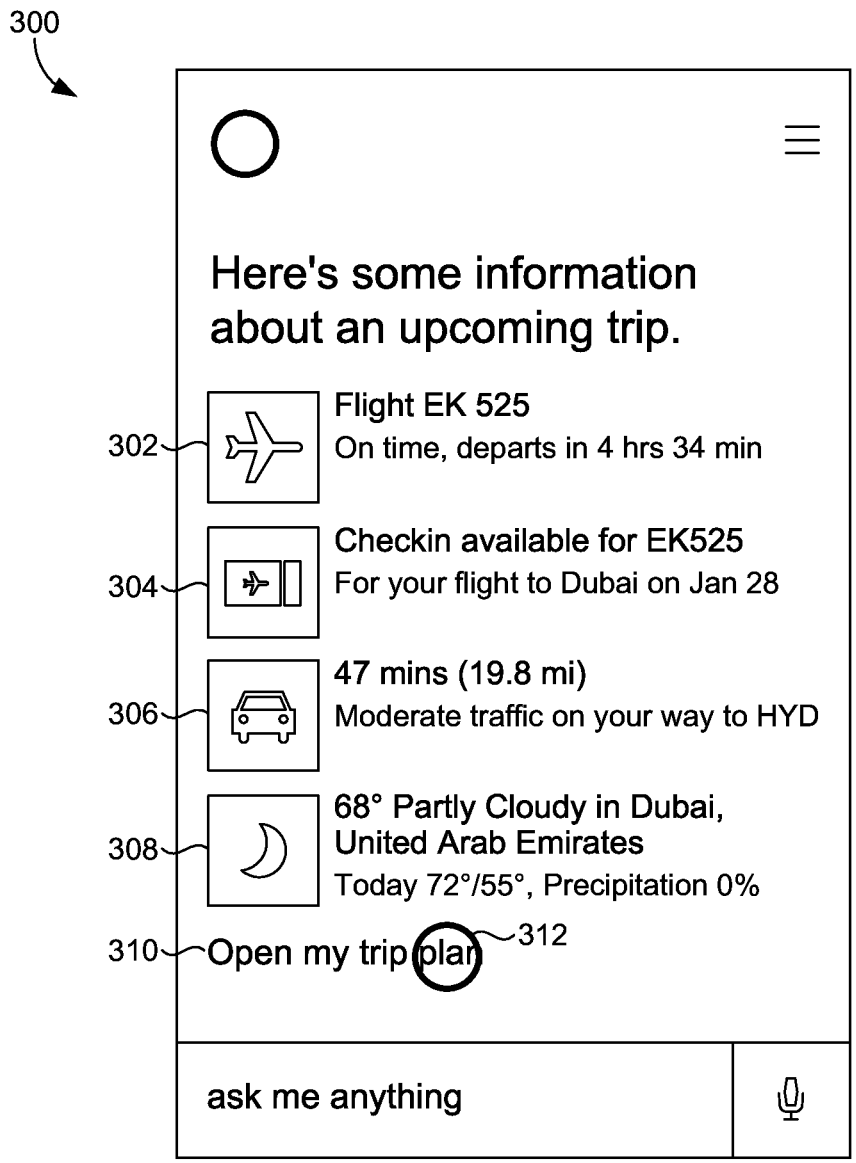
FIG. 3 is a screenshot of a mini taskline, in accordance with embodiments described herein.

Turning now to FIG. 3, a screenshot is depicted of a mini taskline 300, in accordance with embodiments described herein. Mini taskline 300 comprises subtasks 302, 304, 306, and 308, all of which correspond to the task, which is an upcoming trip. These subtasks include flight information, check-in information, time to drive to the airport, and weather in the destination city. As shown by item 310, a user selection, indicated by item 312, of "open my trip plan," can open a full taskline, shown in FIG. 4, corresponding to mini taskline 300.

Figure 4:
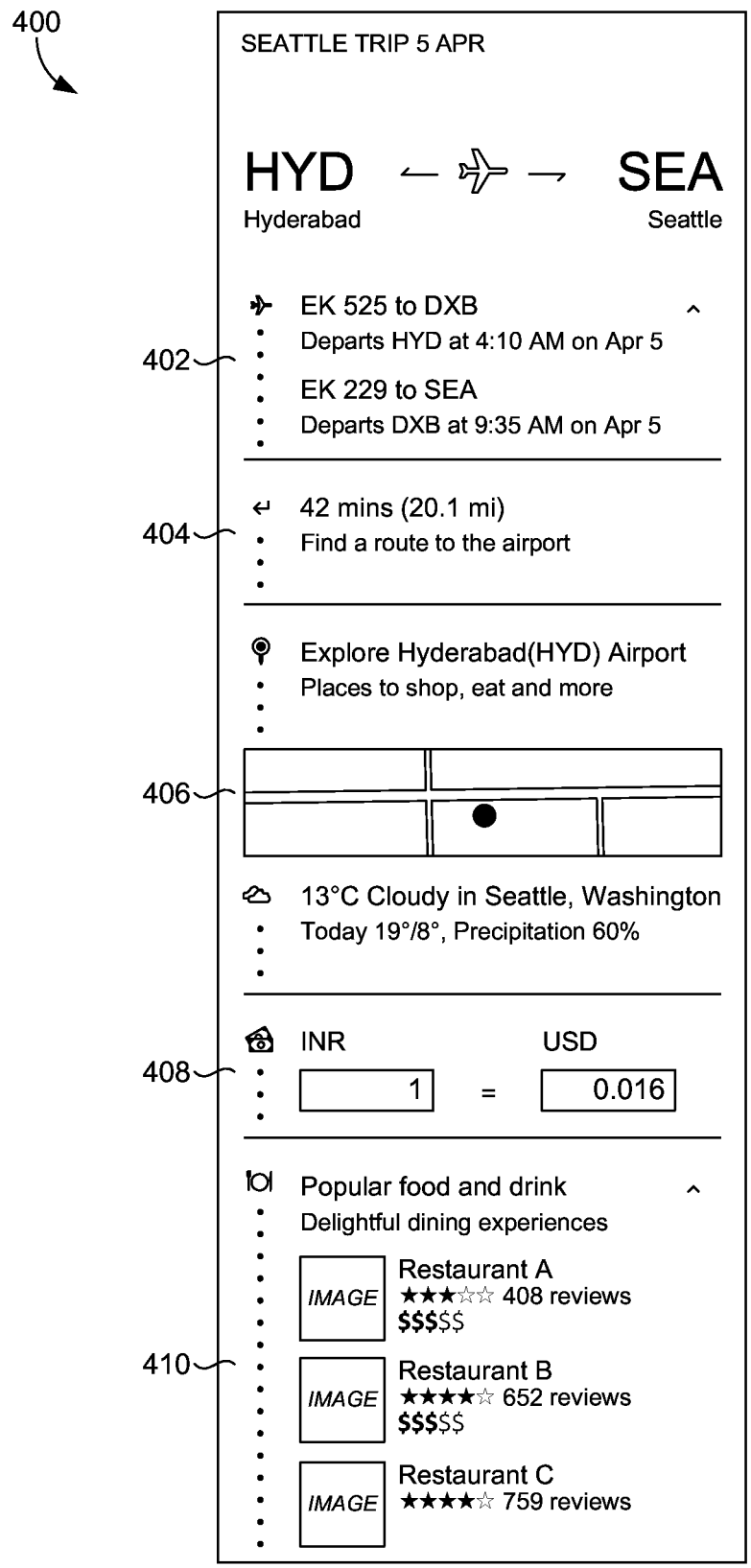
FIG. 4 is a screenshot of a dynamic taskline displayed in response to a user selection on the screenshot of FIG. 3, in accordance with embodiments described herein.

As mentioned, FIG. 4 is a screenshot of a dynamic taskline 400 displayed in response to a user selection on the screenshot of FIG. 3. This dynamic taskline, in one embodiment, could be stored in its current form on the user's device and thus be available to the user even when the user's device is not online. When the device is online and the dynamic taskline is modified, the modified taskline could be stored on the device for future offline use. Multiple subtasks are illustrated in FIG. 4, each of which is associated with the same task, which here, is a Seattle trip on April 5. As shown, subtask 402 is the user's flight information, showing two legs of the trip from Hyderabad to Seattle. Subtask 404 is the user's route to the airport. Subtask 406 is information regarding Hyderabad Airport, where the user initiates the trip to Seattle. Subtask 408 is currency information between Indian and U.S. currency, and subtask 410 is restaurant recommendations for the user once the user arrives in the destination city of Seattle. As mentioned, the subtasks are identified based on contextual information associated with the user. While some systems use solely the user's location, such as Seattle in this example, this system determines which restaurants to present to the user based on much more than just a location. For instance, the user's past restaurant choices, as inferred from social media postings and other interactions, browser history, etc., can be used to determine which restaurants the user would like.

Figure 5:
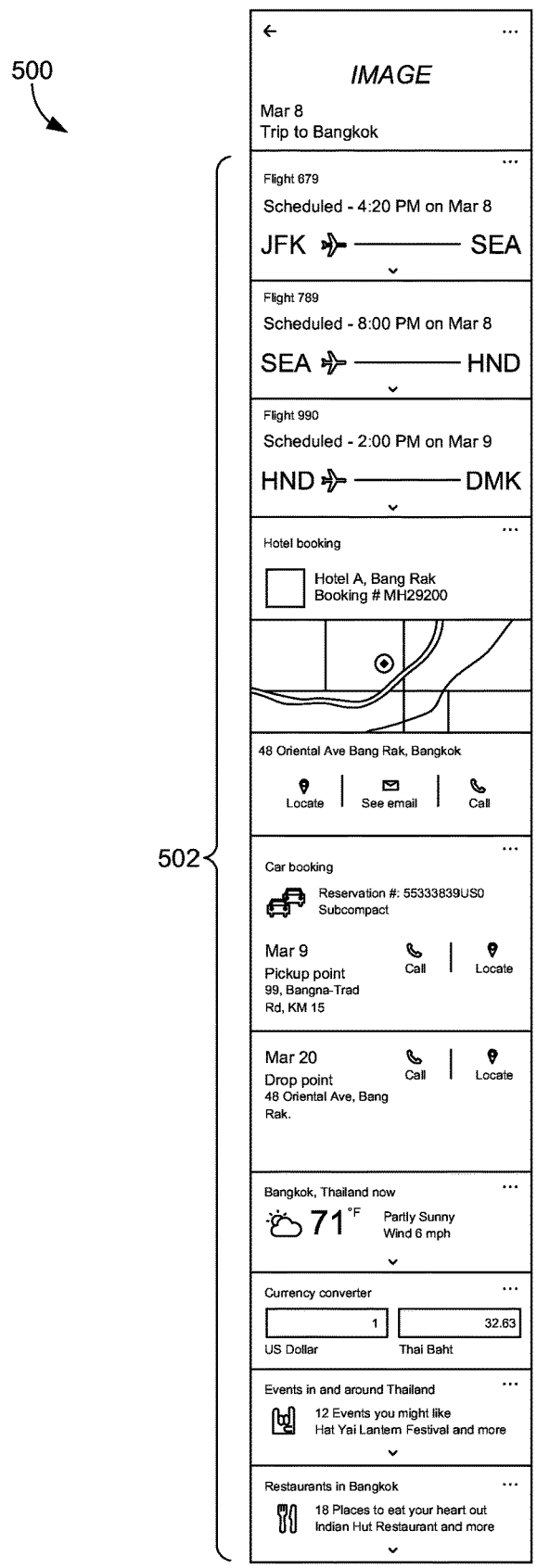
FIG. 5 is a screenshot of a dynamic taskline displayed in response to a user selection on the screenshot of FIG. 5, in accordance with embodiments described herein.

FIG. 5 is a screenshot of another dynamic taskline 500, in accordance with embodiments described herein. Taskline 500 includes a plurality of subtasks, identified by item 502 for simplicity. The task is a user's trip to Bangkok, and the related subtasks include flight scheduling, a hotel booking, a car booking, weather information for the destination location, a currency converter, and events and restaurant recommendations in the destination cities. It should be noted that the subtasks illustrated in the figures herein are provided solely as examples of subtasks, and that these particular subtasks are not limiting to embodiments described herein. Other subtasks could be identified and presented for the user based on many factors, including contextual information associated with the user and what the task is.

Figure 6:
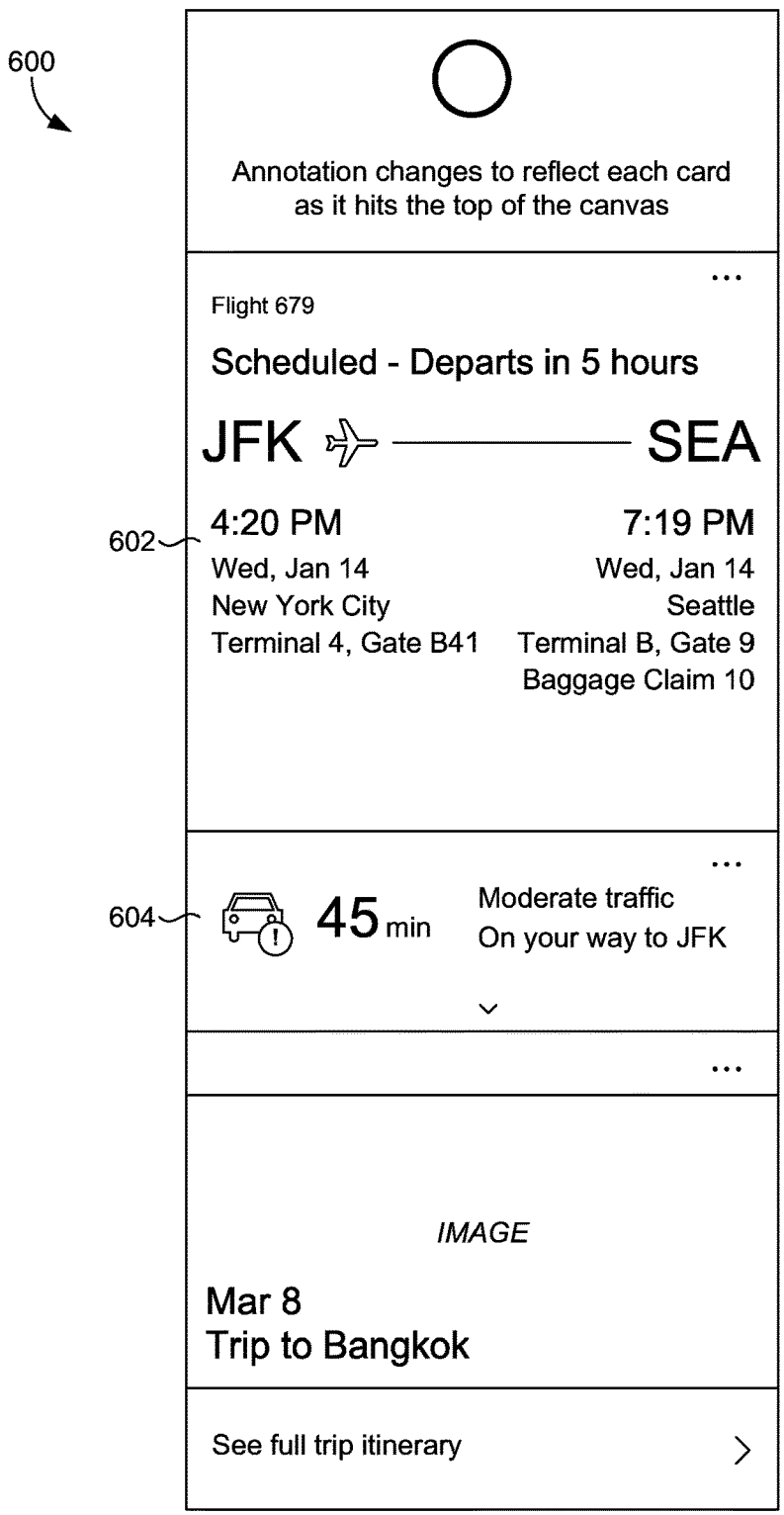
FIGS. 6-8 are screenshots of dynamic tasklines having contents based on a current location of a user, in accordance with embodiments described herein.
Figure 7:
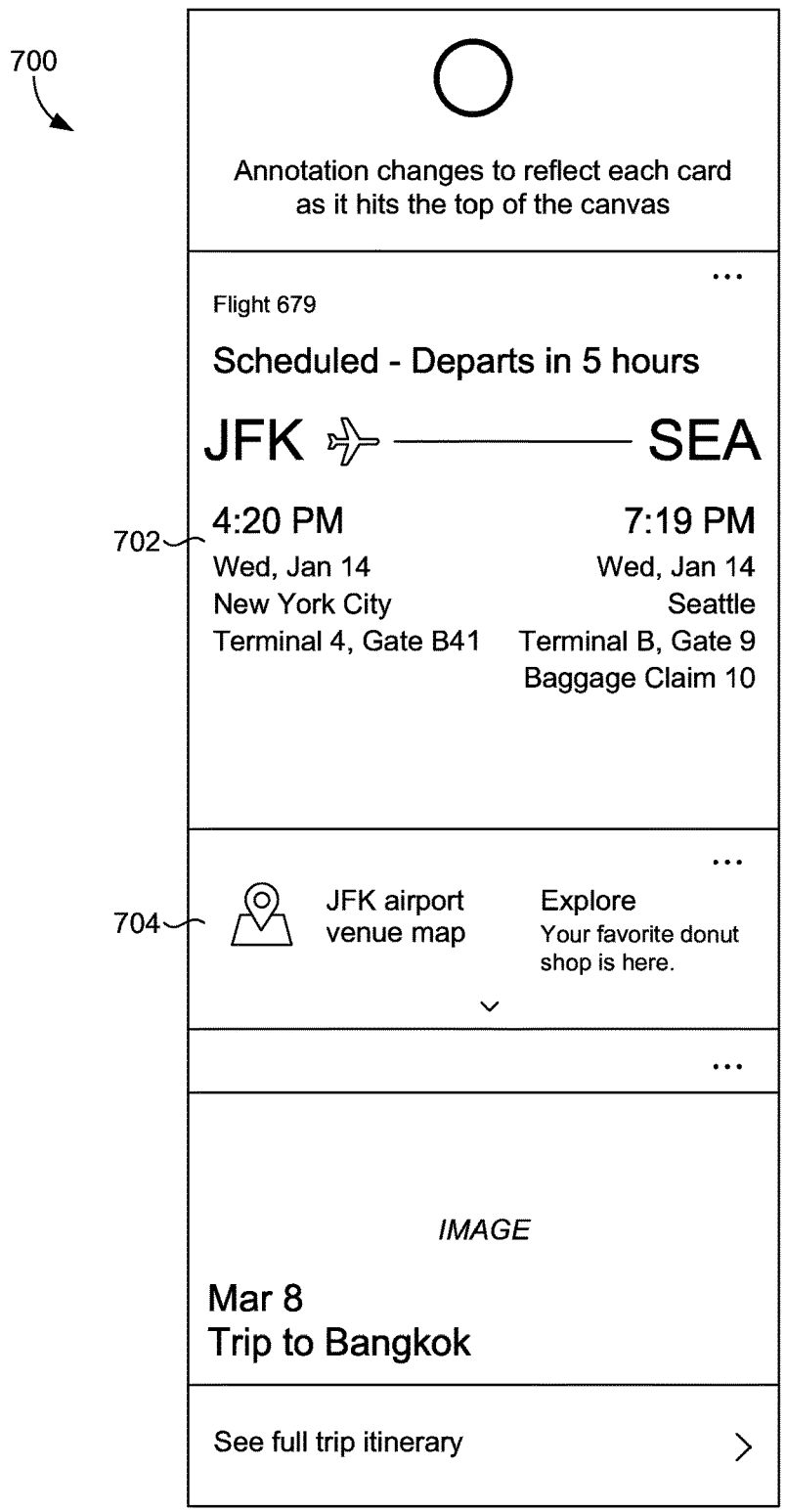
Figure 8:
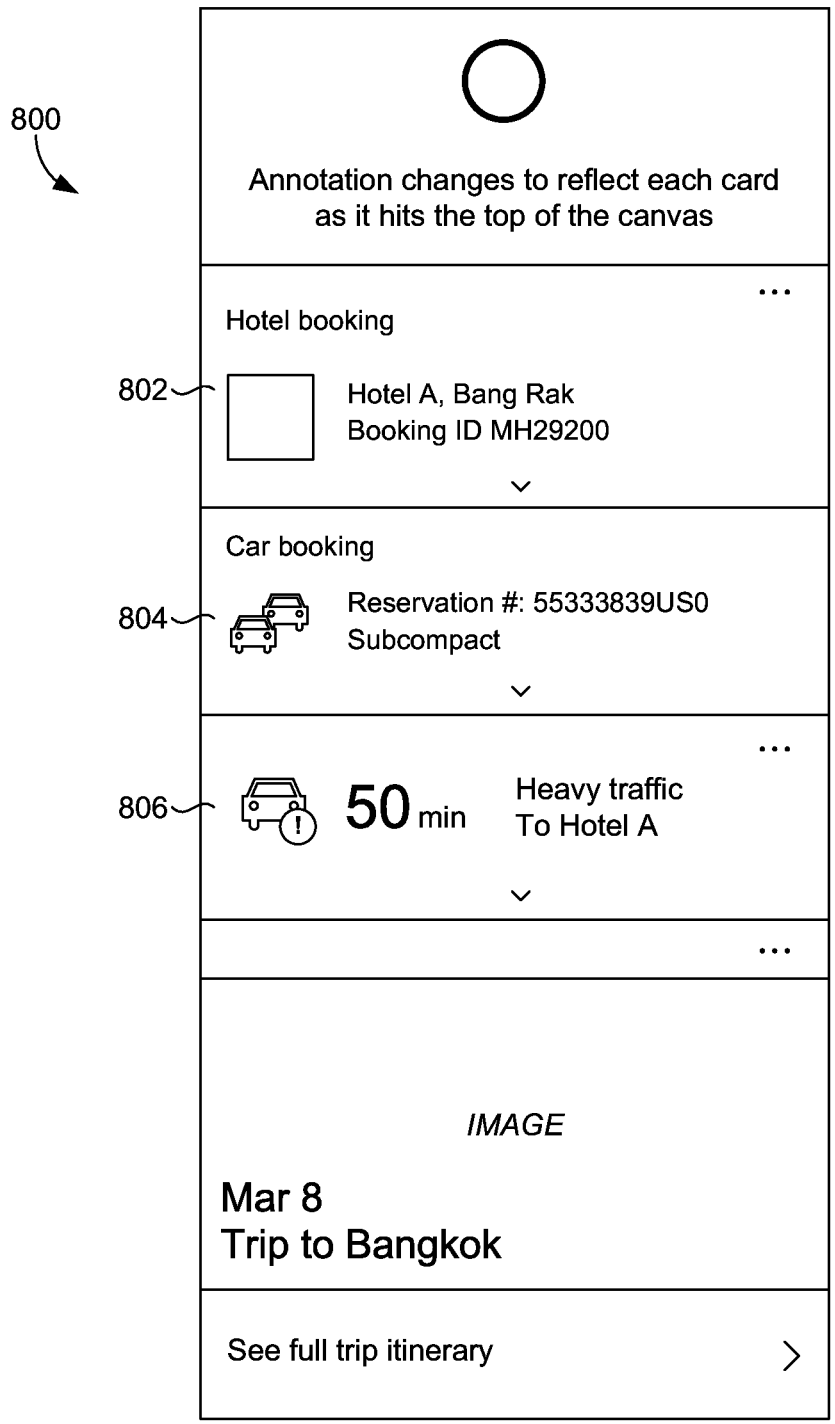

FIGS. 6-8 are screenshots of dynamic tasklines having contents based on a current location of a user, in accordance with embodiments described herein. These figures illustrate the dynamic nature of the dynamic tasklines, as described herein. Initially, FIG. 6 depicts a screenshot of a dynamic taskline 600 having subtasks that were identified and ordered based on the user being either at home or on his/her way to the airport, as indicated by the subtasks shown here. These subtasks include subtask 602 of the flight information and subtask 604 of the time it takes to get to the airport, including traffic conditions. At the bottom of this taskline 600 could be an image of the destination location, and an indication of the task, which is the user's trip to Bangkok on March 8.

FIG. 7 illustrates a screenshot of a dynamic taskline 700 having the same task of dynamic taskline 600, but has been dynamically modified based on the user not being located at the JFK airport for the first leg of the flight to Bangkok, with the first leg being a route from New York City to Seattle. Subtasks in taskline 700 include subtask 702 of the flight information, and subtask 704 of a map of JFK airport. Importantly, subtask 704 illustrates the personalized nature of the tasklines described herein. For instance, subtask 704 provides an indication to the user that the user's favorite donut shop is located in the JFK airport. This was provided to the user based on contextual information gathered for that particular user. For instance, this could have been determined by the user posting about that donut shop on a social media site, or by accessing the user's browsing history, where the user may have searched for that donut shop in multiple locations. Similarly, dynamic taskline 800 has been dynamically modified based on the user being located in the destination city, which here, is Bangkok. Once in the destination city, the user's interest and priorities may change. For instance, the subtasks shown in dynamic taskline 800 include subtask 802 of the user's hotel booking, subtask 804 of the car booking, and subtask 806 of the traffic information from the airport to the user's hotel.

Figure 9:
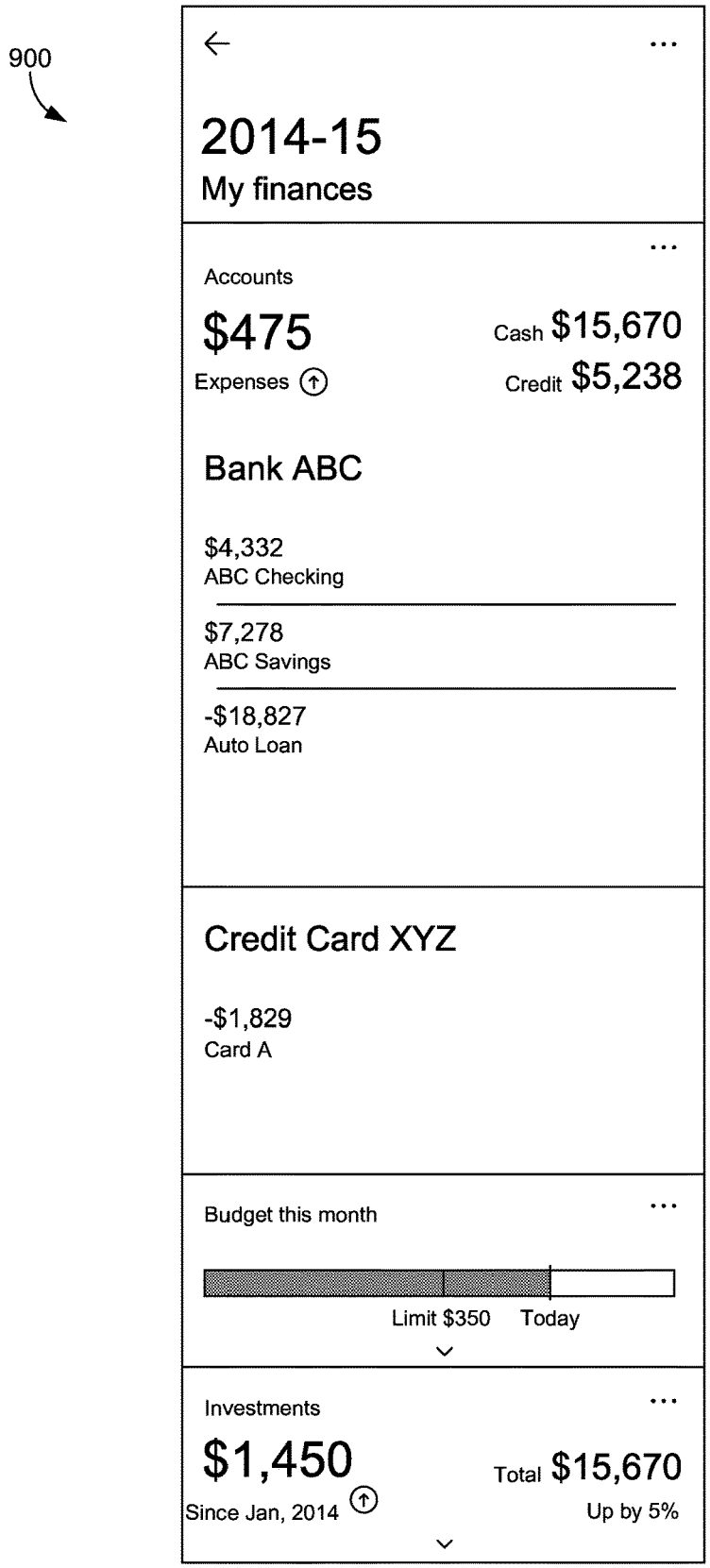
FIG. 9 is a screenshot of a dynamic taskline, in accordance with embodiments described herein.
Figure 10:
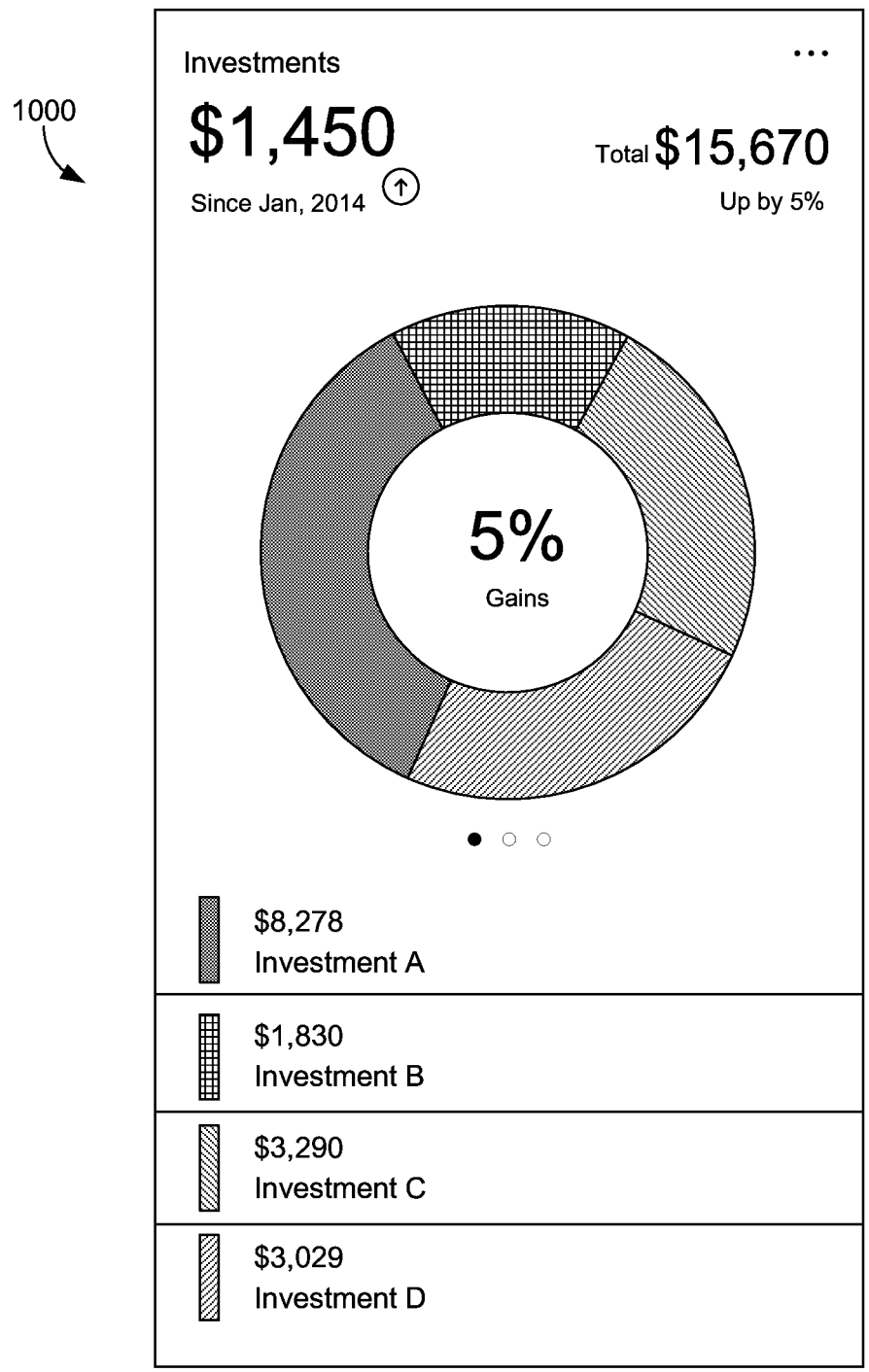
FIG. 10 a screenshot of details corresponding to the dynamic taskline of FIG. 9, in accordance with embodiments described herein.

Referring now to FIG. 9, a screenshot is depicted of another dynamic taskline 900, in accordance with embodiments described herein. The dynamic taskline 900 of FIG. 9, the task is related to the user's finances for the year. For instance, subtasks related to the user's finances may include various checking/savings accounts, the user's debts, credit card balances and other information relating to credit card, budget information, and investment information, etc. This provides a single area on the user's device where the user can check the status of the user's finances, instead of logging into multiple accounts, which is time intensive for the user. The information illustrated in FIG. 9 may have been retrieved by way of contextual information, and may additionally require the user to input username/password information for each account, when required. Similar to the other screenshots described herein, the information relating to the user's financial information in FIG. 9 may be accessible to the user even when the user's device is offline, and would then be updated the next time the user's device is online. The screenshot 1000 of FIG. 10 illustrates more detailed information that can be accessed by way of a user selection on FIG. 9. For example, if a user would like to view more detailed information about that user's investments, the user can access information, such as the information shown in screenshot 1000, to easily view this detailed information on the user's investments.

Figure 11:
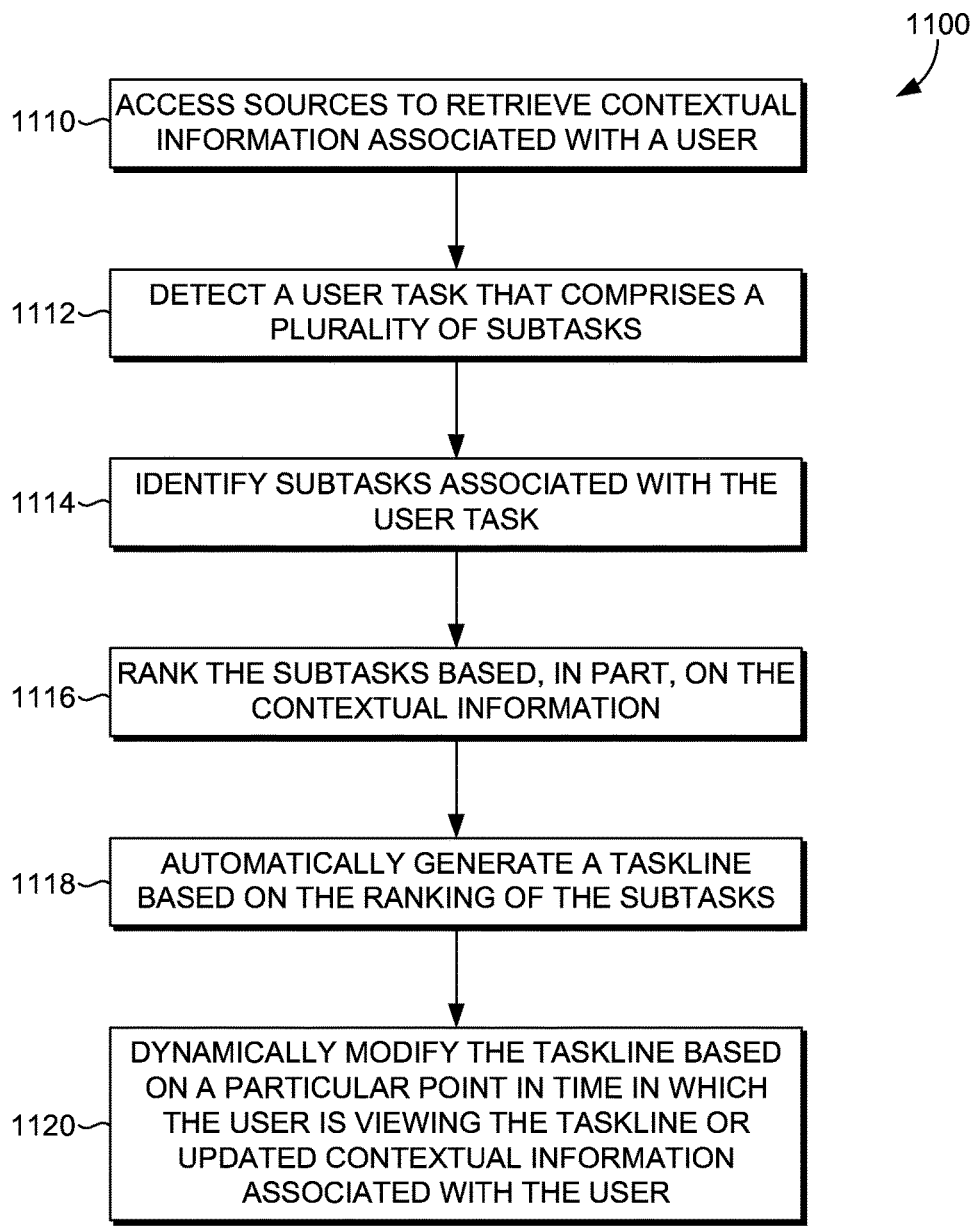
FIG. 11 is a flow diagram showing an exemplary method for generating a dynamic taskline, in accordance with embodiments described herein.

FIG. 11 is a flow diagram showing an exemplary method 1100 for generating a dynamic taskline, in accordance with embodiments described herein. At block 1110, sources are accessed to retrieve contextual information associated with a user. As mentioned, contextual information can be retrieved from various sources, including an e-mail system, Internet/browser search history, search result selections, calendar entries, social media interactions, photographs taken, etc. Contextual information may be stored in a data store, and may periodically be updated, such as at predetermined intervals of time, when new contextual information is detected, etc. At block 1112, a user task is detected, where the user task comprises a plurality of subtasks. The user task is detected from the contextual information associated with the user. In one embodiment, the user task may be determined based on a point in time that the user task is to occur. For instance, multiple potential user tasks may be detected from the user's contextual information. The one selected may be the task that the user needs to complete first. For instance, a user task to purchase a new camera and a user task to plan the user's finances may both be detected. But, it could be determined that the user is leaving on vacation in one week. Thus, the user task to purchase a new camera that is to be used on that vacation may take precedence over the task to plan the user's finances. In some embodiments, multiple user tasks are provided to the user in the form of separate dynamic tasklines. As described herein, in some embodiments, a user task is a long running task that comprises one or more subtasks. As used herein, a long running task is a task that may take some time for the user to complete it, and that includes subtasks that are all related to the task at hand. While termed subtasks, a subtask may not necessarily be a task, but merely something that may be useful to the user. For example, a subtask of the quickest route to the airport associated with the user's task of an upcoming trip may not be something for user to actually do, but it is something for the user to consider when traveling to the airport.

At block 1114, subtasks that are associated with the user task are identified. In one embodiment, subtasks are identified using the contextual information associated with the user. For instance, subtasks may be determined based on how many steps the user took in a day, a doctor's appointment that the user has on his/her calendar, etc. In another embodiment, subtasks may be determined using a rules-based system based on the task. For instance, a task related to travel may have predetermined subtasks of car rental, hotel rental, airline information, airport information, travel information to the airport, suggested restaurants, etc. Even when subtasks are determined using a rules-based system, contextual information may additionally be used to personalized the subtasks. For example, providing restaurant suggestions may be a predetermined subtask to present to the user when the user task is an upcoming trip, but the actual suggestions may be determined based on contextual information to determine what kind of food the user likes, where the user typically eats, etc. In one embodiment, the user may be able to contribute information to be added to an existing subtask, or to the creation of a new subtask. For instance, user input may be received associated with the user task. This user input could be used to generate a user-created subtask, which could then be added to the taskline. This allows the user to have some input as to the subtasks that the user feels would help complete the user task.

At block 1116, the subtasks are ranked, in part, based on the user's contextual information. The ranking of the subtasks could be based on a determination as to what is most important to the user at the particular time that the subtasks are determined. As mentioned, contextual information may be continually updated in the system, and this updated contextual information may be used to infer what the user would be most interested in at that particular time. As shown in FIGS. 6-8, different subtasks are presented on the taskline based on the location of the user. The determination as to which subtasks are presented on each taskline 600, 700, and 800, and the order in which the subtasks are displayed could be determined based on a ranking system. As such, the ranking of the subtasks could be done using many factors, including contextual information, such as the location of the user at a particular time, an inference as to what would be the most useful to the user at the particular time, and the like.

At block 1118, a taskline is automatically generated based on the ranking of the subtasks. As mentioned, the taskline generated is personalized to the user. Instead of simply providing generic information to the user, such as restaurant suggestions based on a location, restaurants are selected based on contextual information, which provides insight as to what the user actually likes and what types of restaurants the user typically visits. In some embodiments, the taskline may be available to the user even when the user's computing device is offline. At block 1120, the taskline is dynamically modified based on a particular point in time in which the user is viewing the taskline or updated contextual information associated with the user.

Figure 12:
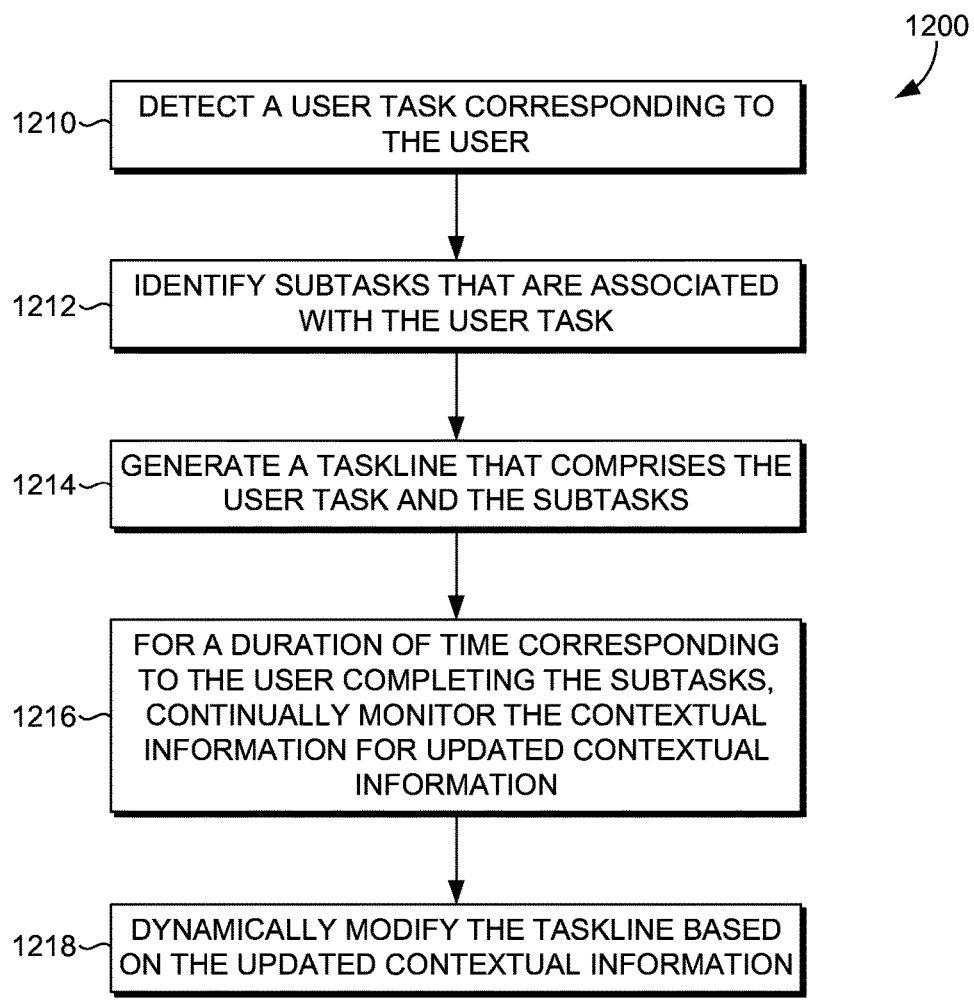
FIG. 12 is another flow diagram showing an exemplary method for generating a dynamic taskline, in accordance with embodiments described herein.

FIG. 12 is another flow diagram showing an exemplary method 1200 for generating a dynamic taskline, in accordance with embodiments described herein. At block 1210, a user task corresponding to the user is detected. This detection of a user task may be based, at least in part, on contextual information associated with a user, which indicates what is important to the user, the user's likes and dislikes, the user's interests, etc. The contextual information may be determined by accessing one or more sources, which may include an e-mail system, browser history, search result selections, a calendar, social media interactions, photographs taken or stored by the user, etc. In some embodiments, the user task is a long running task that comprises a plurality of subtasks that, when completed, contribute to a completion of the user task. At block 1212, subtasks that are associated with the user task are identified. In embodiments, subtasks may be received or identified from a third party. A third party could simply provide information to the system that could be used to determine a subtask, or could provide the actual subtask. As mentioned herein, the user may also provide input corresponding to the user task. This input could be used to generate a subtask that is used in the generation of the taskline. At block 1214, a taskline is generated that comprises the user task and the subtasks. This taskline is personalized to the user based on the contextual information. At block 1216, for a duration of time corresponding to the user completing the subtasks, contextual information associated with the user is continually monitored for updated contextual information. This updated contextual information is used to dynamically modify the taskline at block 1218. The dynamic modification of the task line may include modifying a display order of the subtasks in the taskline. This could be done by a ranking system or by some other means.

Figure 13:
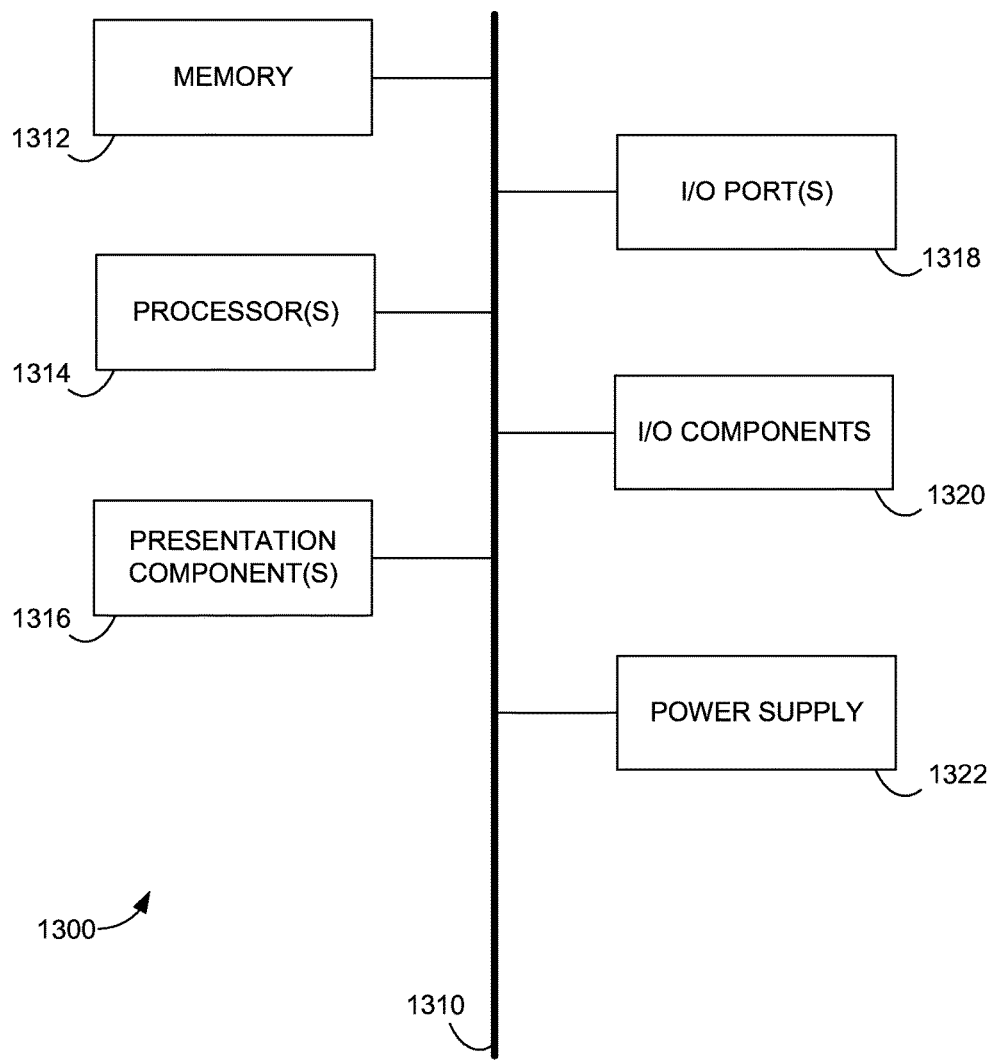
FIG. 13 is a block diagram of an exemplary computing environment suitable for use in implementing embodiments described herein.

Having briefly described an overview of embodiments of the present invention, an exemplary operating environment in which embodiments described herein may be implemented is described below in order to provide a general context for various aspects of the present invention. Referring initially to FIG. 13 in particular, an exemplary operating environment for implementing embodiments described herein is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors 1314 that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 1314 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may coexist with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 1300. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1300. The computing device 1300 may be equipped with depth cameras, such as stereoscopic camera systems, infrared camera systems, RGB camera systems, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

Embodiments presented herein have been described in relation to particular embodiments which are intended in all respects to be illustrative rather than restrictive. It will be understood that certain features and sub-combinations are of utility and may be employed without reference to other features or sub-combinations. This is contemplated by and is within the scope of the claims.

What is claimed is:

1. A system for automatically generating a dynamic taskline, the system comprising:
a taskline generation engine having one or more processors and one or more computer-readable storage media, the taskline generation engine configured to:
access one or more sources to retrieve contextual information associated with a user;
based, at least in part, on the contextual information, detect a user task corresponding to the user, wherein the user task is a long running task that comprises a plurality of subtasks that, when completed, contribute to a completion of the user task,
identify one or more subtasks that are associated with the user task;
ranking the one or more subtasks based, in part, on a current location of the user;
generate a full taskline that is customized to the user, wherein the full taskline comprises the user task and the one or more subtasks, the generating based on the ranking of the one or more subtasks;
generate a mini taskline associated with the user task, wherein the mini taskline summarizes the full taskline by displaying at least one of the one or more subtasks, and wherein the mini taskline comprises an indicator allowing the user to display the full taskline;
for a duration of time corresponding to the user completing the one or more subtasks, continually monitor the contextual information for updated contextual information;
using data measured by a hardware device associated with the user to detect the user's current location; and
dynamically modify the full taskline based on the updated contextual information and the detected user's current location.

2. The system of claim 1, wherein the user task is a long running task comprising the one or more subtasks.

3. The system of claim 1, wherein the full taskline is further dynamically modified based on a particular point in time in which the user is viewing the taskline.

4. The system of claim 1, wherein the full taskline is further dynamically modified based on a determination of which of the one or more subtasks have been accomplished by the user.

5. The system of claim 1, wherein the full taskline is further dynamically modified based on a current location of the user.

6. One or more computer storage media having computer-executable instructions embodied thereon that, when executed by one or more processors, causes the one or more processors to perform a method for automatically generating a dynamic taskline, the method comprising:
accessing one or more sources to retrieve contextual information associated with a user;
from at least the contextual information, detecting a user task that comprises a plurality of subtasks;
identifying one or more subtasks associated with the user task;
ranking the one or more subtasks based, in part, on a current location of the user;
automatically generating a taskline based on the ranking of the one or more subtasks;
for a duration of time corresponding to the user completing the one or more subtasks, continually monitoring the contextual information for updated contextual information;
using data measured by a hardware device associated with the user to detect the user's current location;
dynamically modifying the taskline based on a particular point in time in which the user is viewing the taskline, the detected user's current location, or updated contextual information associated with the user; and syncing any modifications to the taskline across any other devices associated with the user.

7. The media of claim 6, wherein the generated taskline is personalized to the user based on the contextual information.

8. The media of claim 6, wherein the user task is determined based on a time that the user task is to occur.

9. The media of claim 6, wherein the user task is a long running task comprising the one or more subtasks.

10. The media of claim 6, further comprising:

receiving user input associated with the user task;

utilizing the user input to generate a user-created subtask; and adding the user-created subtask to the taskline.

11. The media of claim 6, wherein the ranking of the one or more subtasks is based on a determination as to what is most important to the user at that particular time.

12. The media of claim 6, wherein the one or more sources comprise one or more of an e-mail system, Internet search history, search result selections, calendar entries, social media interactions, or photographs taken.

13. The media of claim 6, wherein the taskline is available to the user on a computing device even when the computing device is offline.

14. A computer-implemented method for automatically generating a dynamic taskline, the method comprising:

based, at least in part, on contextual information associated with a user, detecting a user task corresponding to the user, wherein the user task is a long running task that comprises a plurality of subtasks that, when completed, contribute to a completion of the user task;

identifying one or more subtasks that are associated with the user task;

using data measured by a hardware device associated with the user to detect the user's current location;

ranking the one or more subtasks based, in part, on the user's current location;

generating a taskline that comprises the user task and the one or more subtasks, the generating based on the ranking;

for a duration of time corresponding to the user completing the one or more subtasks, continually monitoring the contextual information for updated contextual information;

dynamically modifying the taskline based on the updated contextual information and the detected user's current location; and syncing any modifications to the taskline across other devices associated with the user.

15. The method of claim 14, wherein the generated taskline is personalized to the user based on the contextual information.

16. The method of claim 14, wherein dynamically modifying the taskline based on the continually monitored user context further comprises modifying a display order of the one or more subtasks in the taskline.

17. The method of claim 14, wherein the user context indicates what is important to the user.

18. The method of claim 14, further comprising receiving at least one of the one or more subtasks from a third party.

19. The method of claim 14, further comprising:

receiving input from the user corresponding to the user task; and utilizing the input from the user to dynamically modify the taskline.

20. The method of claim 14, further comprising accessing one or more sources to retrieve the contextual information associated with the user, wherein the one or more sources comprise one or more of an e-mail system, Internet search history, search result selections, a calendar, social media sites, or a photograph storage.

\* \* \* \* \*